(12) United States Patent
Holgersson et al.

(10) Patent No.: US 12,197,203 B2
(45) Date of Patent: Jan. 14, 2025

(54) EXIT PATH DETERMINATION FOR A ROBOTIC WORK TOOL

(71) Applicant: HUSQVARNA AB, Huskvarna (SE)

(72) Inventors: Jonas Holgersson, Huskvarna (SE); Stefan Bergström, Huskvarna (SE); Hugo Johansson, Jönköping (SE); Erik Starhagen, Huskvarna (SE); Claes Johannesson, Gränna (SE); Marcus Stjärnås, Jönköping (SE); Fredrik Klackensjö, Forserum (SE); Tommy Glimberg, Nässjö (SE); Stefan Grufman, Bankeryd (SE); Mattias Kamfors, Jönköping (SE); Marcus Liljedahl, Huskvarna (SE); Björn Mannefred, Jönköping (SE); Beppe Hellsin, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 270 days.

(21) Appl. No.: 17/784,488

(22) PCT Filed: Dec. 2, 2020

(86) PCT No.: PCT/EP2020/084230
§ 371 (c)(1),
(2) Date: Jun. 10, 2022

(87) PCT Pub. No.: WO2021/115869
PCT Pub. Date: Jun. 17, 2021

(65) Prior Publication Data
US 2023/0034100 A1  Feb. 2, 2023

(30) Foreign Application Priority Data

Dec. 12, 2019 (SE) .................... 1951435-5

(51) Int. Cl.
*G05D 1/00* (2024.01)
*G05D 1/639* (2024.01)
*A01D 101/00* (2006.01)

(52) U.S. Cl.
CPC .............. *G05D 1/00* (2013.01); *G05D 1/639* (2024.01); *A01D 2101/00* (2013.01)

(58) Field of Classification Search
CPC .............. G05D 1/0212; G05D 1/0265; G05D 2109/10; G05D 1/43; G05D 1/00;
(Continued)

(56) References Cited

U.S. PATENT DOCUMENTS

| 11,079,240 | B2 * | 8/2021 | Tajeddin ............. G05D 1/0274 |
| 2007/0156286 | A1 * | 7/2007 | Yamauchi ............ G05D 1/027 700/245 |

(Continued)

FOREIGN PATENT DOCUMENTS

| CN | 108803602 A | 11/2018 |
| CN | 110058590 A | 7/2019 |

(Continued)

OTHER PUBLICATIONS

International Search Report and Written Opinion for PCT Application No. PCT/EP2020/084230, dated Mar. 1, 2021.

(Continued)

*Primary Examiner* — Sze-Hon Kong
(74) *Attorney, Agent, or Firm* — Burr & Forman LLP (57) ABSTRACT

A robotic work tool system (200) comprising a robotic work tool (100), the robotic work tool (100) being configured to determine (410) that the robotic work tool (100) has entered a state of limited movement; determine (420) an exit path; and exit (430) the state of limited movement by navigating the exit path.

15 Claims, 3 Drawing Sheets

(58) Field of Classification Search
CPC ...... G05D 1/639; A01D 34/008; A01D 34/00; A01D 2101/00
See application file for complete search history.

(56) References Cited

U.S. PATENT DOCUMENTS

| | | | | |
|---|---|---|---|---|
| 2007/0276541 | A1* | 11/2007 | Sawaski | G05D 1/0246 |
| | | | | 700/253 |
| 2011/0234153 | A1* | 9/2011 | Abramson | B60L 53/68 |
| | | | | 901/1 |
| 2012/0101679 | A1* | 4/2012 | Anderson | G05D 1/0088 |
| | | | | 901/1 |
| 2013/0214726 | A1* | 8/2013 | Teng | G05D 1/0234 |
| | | | | 250/349 |
| 2015/0025710 | A1* | 1/2015 | Park | G05D 1/0022 |
| | | | | 701/2 |
| 2015/0212520 | A1* | 7/2015 | Artes | A47L 11/4011 |
| | | | | 701/2 |
| 2015/0366137 | A1* | 12/2015 | Markusson | B60L 3/0061 |
| | | | | 320/107 |
| 2016/0129593 | A1* | 5/2016 | Wolowelsky | G05D 1/0219 |
| | | | | 901/1 |
| 2017/0332862 | A1* | 11/2017 | Jun | A47L 9/30 |
| 2018/0178376 | A1* | 6/2018 | Lalonde | B25J 9/1676 |
| 2019/0008353 | A1* | 1/2019 | Kayama | G05D 1/0088 |
| 2019/0138025 | A1* | 5/2019 | Crandall | E04H 6/426 |
| 2019/0187699 | A1* | 6/2019 | Salour | G05D 1/024 |
| 2019/0196467 | A1* | 6/2019 | Aldana Lopez | G08G 5/0021 |
| 2019/0230850 | A1* | 8/2019 | Johnson | A01D 75/006 |
| 2020/0083979 | A1* | 3/2020 | Roberts | B64U 20/87 |
| 2020/0401155 | A1* | 12/2020 | Alzen | A01D 69/02 |
| 2021/0046655 | A1* | 2/2021 | Deyle | B25J 9/1664 |
| 2021/0206367 | A1* | 7/2021 | Liu | G08G 1/0112 |
| 2022/0047135 | A1* | 2/2022 | Lee | G05D 1/0274 |
| 2022/0163969 | A1* | 5/2022 | Li | G05D 1/0291 |
| 2023/0363610 | A1* | 11/2023 | Zhang | G06T 7/11 |

FOREIGN PATENT DOCUMENTS

| | | |
|---|---|---|
| CN | 110262512 A | 9/2019 |
| EP | 2412222 A2 | 2/2012 |
| EP | 3078315 A1 | 10/2016 |
| EP | 3494769 A1 | 6/2019 |
| EP | 3508048 A1 | 7/2019 |
| JP | 2006318483 A | 11/2006 |
| WO | 02101477 A2 | 12/2002 |
| WO | 2018108178 A1 | 6/2018 |
| WO | 2019116765 A1 | 6/2019 |
| WO | 2019194629 A1 | 10/2019 |

OTHER PUBLICATIONS

Swedish Search Report in Swedish patent application No. 1951435-5, dated Jun. 11, 2020.

* cited by examiner

EXIT PATH DETERMINATION FOR A ROBOTIC WORK TOOL

TECHNICAL FIELD

This application relates to robotic work tools and in particular to a system and a method for providing an improved navigational control for a robotic work tool, such as a lawnmower.

BACKGROUND

Automated or robotic power tools such as robotic lawnmowers are becoming increasingly more popular. In a typical deployment a work area, such as a garden, there are usually many objects (trees, bushes, flower beds, houses, etc.). The work areas may also be of differing sizes and shapes, often consisting of different parts to which the robotic lawnmower may only gain access through for example a narrow corridor. In addition, as the work area is outside, the environment may sometimes be difficult to navigate, such as when muddy possibly causing the robotic lawnmower to slip.

A work area may thus contain many obstacles that a robotic lawnmower may become trapped behind. The work area may also be enclosed by a boundary wire with the purpose of keeping the robotic lawnmower inside the work area, but also providing yet an obstacle that the robotic lawnmower may be trapped behind.

A robotic lawnmower may not be able to provide a sufficient servicing of a work area, possibly leading to some areas not being serviced and some areas being over-serviced.

Although this problem is disclosed related to robotic lawnmowers, the same problem exist for other robotic work tools, especially those adapted for outdoor use.

Thus, there is a need for an improved mariner of enabling a robotic work tool, such as a robotic lawnmower, to escape situations where it may be trapped.

SUMMARY

It is therefore an object of the teachings of this application to overcome or at least reduce the problems discussed herein by providing a robotic work tool system comprising a robotic work tool. The robotic work tool may operate in a robotic work tool system comprising a charging station. The robotic work tool is configured to determine that the robotic work tool has entered a state of limited movement; determine an exit path; and exit the state of limited movement by navigating the exit path.

A robotic work tool is considered to be in a state of limited movement if it has become trapped in an (smaller) area, and is unable to escape this (smaller) area. A simple detection of an object is not to be considered as being in a state of limited movement, as the robotic work tool is not hindered to take evasive actions by a simple object which is detected. The mere detection of the object and the resulting evasive maneuver is an indication that the robotic work tool was not in a state of limited movement.

In one embodiment the robotic work tool is configured to determine that the robotic work tool has entered a state of limited movement based on determining that a limit event frequency exceeds a limit event frequency threshold. In one such embodiment the limit event frequency is associated with a maximum distance, the limit event frequency being related to the number of forced turns, each turn defining a maximum distance as the distance between two turns. In addition or as an alternative such embodiment the limit event frequency is associated with a number of collisions during a time period, i.e. the frequency of collisions during that time period. In addition or as an alternative such embodiment the limit event frequency is associated with a number of turns being executed during a distance travelled, i.e. the frequency of turns during a distance travelled. Further examples of limit event frequencies will be given below and in the detailed description.

In one embodiment the robotic work tool is configured to determine that the robotic work tool has entered a state of limited movement based on a determination that the robotic work tool has been travelling a maximum distance falling short of a threshold distance, the maximum distance having been travelled during a threshold period of time. In one such embodiment the robotic work tool is further configured to determine the distance travelled as an accumulated distance travelled in one specific direction. And in one such embodiment the specific direction is a resulting direction of the movements of the robotic work tool during the threshold period of time and the accumulated distance is a resulting distance of the movements of the robotic work tool during the threshold period of time.

In one embodiment the robotic work tool is further configured to determine the distance travelled as a distance travelled without the robotic work tool being forced to execute a turn.

In one embodiment the robotic work tool is configured to determine that the robotic work tool has entered a state of limited movement based on a determination that the robotic work tool has been travelling within an area smaller than a threshold size for a threshold period of time.

In one embodiment the robotic work tool is configured to determine that the robotic work tool has entered a state of limited movement based on a determination that the robotic work tool has detected a number of forced turns exceeding a forced turns threshold number.

In one such embodiment the robotic work tool is configured to determine that the robotic work tool has entered a state of limited movement based on a determination that the robotic work tool has detected a number of forced turns exceeding a forced turns threshold number during a threshold time period.

In addition or as an alternative embodiment the robotic work tool is configured to determine that the robotic work tool has entered a state of limited movement based on a determination that the robotic work tool has detected a number of forced turns exceeding a forced turns threshold number during a threshold distance travelled.

In addition or as an alternative embodiment the robotic work tool is configured to determine that the robotic work tool has entered a state of limited movement based on a determination that the robotic work tool has detected a number of forwards forced turns (FFT) in series with reverse forced turns (RFT) exceeding a threshold forced turns number. In one such embodiment a forced turn is due to detecting a collision. In addition or as an alternative embodiment a forced turn is due to detecting a collision or encountering a wire.

In one embodiment the robotic work tool is configured to determine that the robotic work tool has entered a state of limited movement based on determining: a first position of the robotic work tool; determining a second position of the robotic work tool after a threshold period of time has passed and/or after a threshold distance has been travelled; and determining that the position of the robotic work tool has not changed significantly, based on a determination that the difference between the first and the second position does not exceed a threshold distance.

In one embodiment the robotic work tool is configured to determine that the robotic work tool has entered a state of limited movement based on a determination that the robotic work tool has slid.

In one such embodiment the robotic work tool is configured to determine that the robotic work tool has slid by detecting a movement and comparing the detected movement to a calculated movement, the calculated movement being calculated based on input from sensors for controlling the robotic work tool and/or for deduced reckoning; such as odometers or wheel control signals.

In one embodiment the robotic work tool is further configured to determine a slope (S) of an area and to determine that the robotic work tool has entered a state of limited movement based on the determined slope (S).

In one embodiment the robotic work tool is further configured to determine an intensity of operation for the robotic work tool and to determine that the robotic work tool has entered a state of limited movement based on the determined intensity of operation. In one embodiment the intensity of operation is associated with the load exerted on a work tool (such as a cutting blade). In addition or as an alternative embodiment the intensity of operation is associated with the power delivered to a work tool.

In one embodiment the robotic work tool is configured to determine the exit path as a path leading to a wire and to follow said wire. In one such embodiment the robotic work tool is configured to follow the wire for an escape distance. In one such embodiment the robotic work tool is configured to follow the wire for the escape distance and then navigate in a random manner. In an alternative or additional embodiment, the robotic work tool is configured to follow the wire for the specified distance and then navigate according to a structured operation pattern. One example of a structured operation pattern is to operate in parallel strokes.

In one embodiment the robotic work tool is configured to follow the wire to the charging station.

In one embodiment the robotic work tool is configured to determine the exit path as a path causing the robotic work tool to rotate and then travel an escape distance.

In one embodiment the robotic work tool is further configured to store the numbers of collisions in the path travelled and determine the exit path as a path in a direction where there are no or few detected collisions in the path travelled. In one such embodiment the robotic work tool determines the exit path based on stored position data for historic or previous collisions. In this context "few" may be regarded as being less than a threshold or alternatively being the lowest number of collisions.

In one embodiment the robotic work tool is further configured to determine a path travelled, which path lead to the state of limited movement; and to determine the exit path based on the path travelled. In one such embodiment the robotic work tool is configured to determine the path travelled by storing at least one navigational operation.

In one such embodiment, the navigational operation comprises a command causing a wheel to turn in a direction at a threshold speed. In addition or as an alternative embodiment the navigational operation comprises a count of wheel turns (in a direction at a threshold speed). In addition or as an alternative embodiment the navigational operation comprises a distance travelled. In addition or as an alternative embodiment the navigational operation comprises a speed travelled at for an associated time. In addition or as an alternative embodiment the navigational operation comprises a directional change. In addition or as an alternative embodiment the navigational operation comprises a collision detection.

In one embodiment the robotic work tool is configured to determine the exit path based on the reverse of the path travelled.

In one embodiment the robotic work tool comprises a camera and the robotic work tool is configured to determine the path travelled based on input from the camera.

In one embodiment the robotic work tool is configured to determine the exit path based on the reverse of the path travelled.

In one such embodiment the robotic work tool is configured to determine the exit path as the reverse of the path travelled preceded by a 180 degree rotation of the robotic work tool.

In addition or as an alternative embodiment the robotic work tool is configured to determine the exit path as a path repeatedly crossing the reverse of the path travelled.

In addition or as an alternative embodiment the robotic work tool is configured to determine the exit path as the reverse of the path travelled modified by the robotic work tool leaving and re-entering the path travelled. In addition or as an alternative embodiment the robotic work tool is configured to determine the exit path as a projection of the path travelled.

In one embodiment the robotic work tool is configured to determine the exit path based on a map application.

In one embodiment the robotic work tool is configured to determine the exit path by determine a start position of the robotic work tool in the current path travelled and to determine the exit path as a path to the start position.

In one embodiment the robotic work tool is configured to determine the exit path as a path comprising the robotic work tool rotating and thereafter moving away from the path travelled.

In one embodiment the robotic work tool is configured to determine the exit path as a path in a direction not aligned with the path travelled.

In one embodiment the robotic work tool is a robotic lawnmower.

In one embodiment the robotic work tool is a robotic rototill, a robotic mulching machine, a robotic golf ball collector, or a robotic watering machine.

It is also an object of the teachings of this application to overcome the problems by providing a method for use in a robotic work tool system comprising a robotic work tool, the method comprising determining that the robotic work tool has entered a state of limited movement; determine an exit path; and exit the state of limited movement by navigating the exit path.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein. Like reference numbers refer to like elements throughout.

It should be noted that even though the description given herein will be focused on robotic lawnmowers, the teachings herein may also be applied to, robotic ball collectors, robotic mine sweepers, robotic farming equipment, or other robotic work tools where lift detection is used and where the robotic work tool is susceptible to dust, dirt or other debris.

Figure 1A:
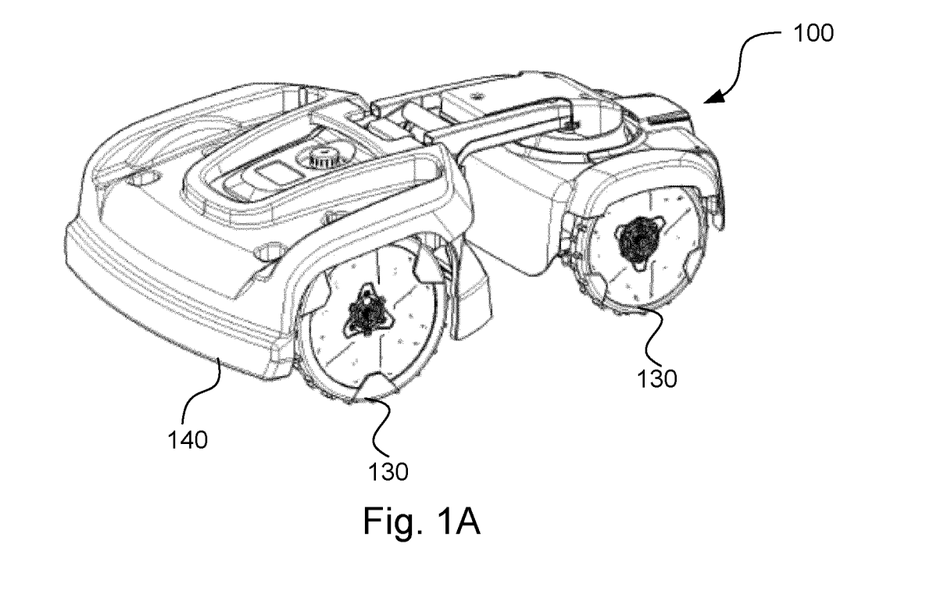
FIG. 1A shows an example of a robotic lawnmower according to one embodiment of the teachings herein.

FIG. 1A shows a perspective view of a robotic work tool 100, here exemplified by a robotic lawnmower 100, having a body 140 and a plurality of wheels 130 (only two wheels are shown). The robotic work tool 100 may be a multi-chassis type, as in FIG. 1A, or a mono-chassis type (as in FIG. 1B). A multi-chassis type comprises more than one body parts that are movable with respect to one another. A mono-chassis type comprises only one main body part.

The robotic lawnmower 100 may comprise charging skids for contacting contact plates (not shown in FIG. 1) when docking into a charging station (not shown in FIG. 1, but referenced 210 in FIG. 2) for receiving a charging current through, and possibly also for transferring information by means of electrical communication between the charging station and the robotic lawnmower 100.

Figure 1B:
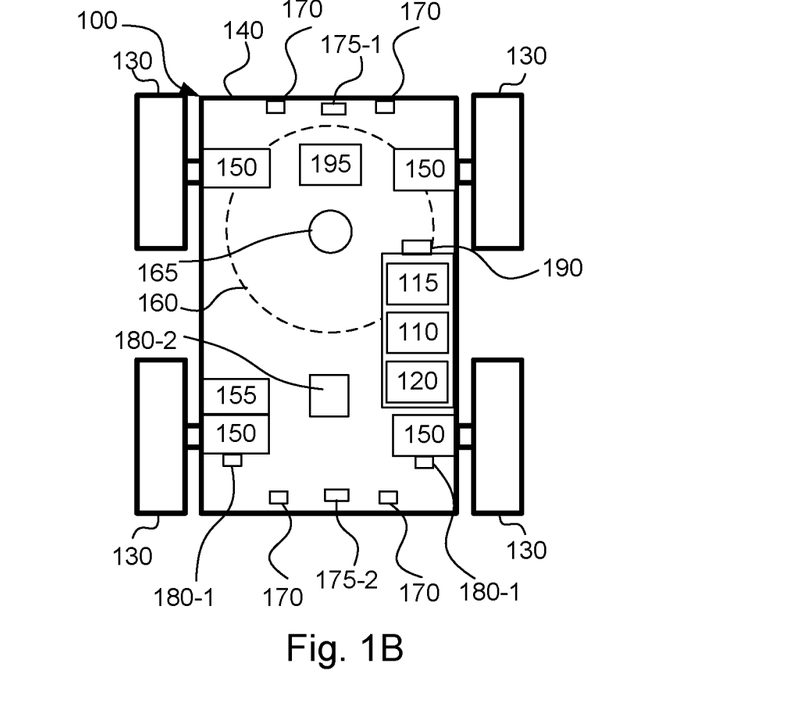
FIG. 1B shows a schematic view of the components of an example of a robotic work tool being a robotic lawnmower according to an example embodiment of the teachings herein.

FIG. 1B shows a schematic overview of the robotic work tool 100, also exemplified here by a robotic lawnmower 100. In this example embodiment the robotic lawnmower 100 is of a mono-chassis type, having a main body part 140. The main body part 140 substantially houses all components of the robotic lawnmower 100. The robotic lawnmower 100 has a plurality of wheels 130. In the exemplary embodiment of FIG. 1B the robotic lawnmower 100 has four wheels 130, two front wheels and two rear wheels. At least some of the wheels 130 are drivably connected to at least one electric motor 150. It should be noted that even if the description herein is focused on electric motors, combustion engines may alternatively be used, possibly in combination with an electric motor. In the example of FIG. 1B, each of the wheels 130 is connected to a respective electric motor. This allows for driving the wheels 130 independently of one another which, for example, enables steep turning and rotating around a geometrical center for the robotic lawnmower 100.

It should be noted though that not all wheels need be connected to each a motor, but the robotic lawnmower 100 may be arranged to be navigated in different manners, for example by sharing one or several motors 150. In an embodiment where motors are shared, a gearing system may be used for providing the power to the respective wheels and for rotating the wheels in different directions. In some embodiments, one or several wheels may be uncontrolled and thus simply react to the movement of the robotic lawnmower 100.

The robotic lawnmower 100 also comprises a grass cutting device 160, such as a rotating blade 160 driven by a cutter motor 165. The grass cutting device being an example of a work tool 160 for a robotic work tool 100. The robotic lawnmower 100 also has (at least) one battery 155 for providing power to the motor(s) 150 and/or the cutter motor 165.

The robotic lawnmower 100 also comprises a controller 110 and a computer readable storage medium or memory 120. The controller 110 may be implemented using instructions that enable hardware functionality, for example, by using executable computer program instructions in a general-purpose or special-purpose processor that may be stored on the memory 120 to be executed by such a processor. The controller 110 is configured to read instructions from the memory 120 and execute these instructions to control the operation of the robotic lawnmower 100 including, but not being limited to, the propulsion of the robotic lawnmower. The controller 110 may be implemented using any suitable, available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic lawnmower 100 may further be arranged with a wireless communication interface 115 for communicating with other devices, such as a server, a personal computer or smartphone, the charging station, and/or other robotic work tools. Examples of such wireless communication devices are Bluetooth®, WiFi® (IEEE802.11b), Global System Mobile (GSM) and LTE (Long Term Evolution), to name a few.

For enabling the robotic lawnmower 100 to navigate with reference to a boundary wire emitting a magnetic field caused by a control signal transmitted through the boundary wire, the robotic lawnmower 100 is further configured to have at least one magnetic field sensor 170 arranged to detect the magnetic field (not shown) and for detecting the boundary wire and/or for receiving (and possibly also sending) information to/from a signal generator (will be discussed with reference to FIG. 2). In some embodiments, the sensors 170 may be connected to the controller 110, possibly via filters and an amplifier, and the controller 110 may be configured to process and evaluate any signals received from the sensors 170. The sensor signals are caused by the magnetic field being generated by the control signal being transmitted through the boundary wire. This enables the controller 110 to determine whether the robotic lawnmower 100 is close to or crossing the boundary wire, or inside or outside an area enclosed by the boundary wire.

The robotic lawnmower 100 also comprises one or more collision detectors 175. In the example of FIG. 1B, the robotic lawnmower 100 comprises a front collision detector 175-1, enabling the robotic lawnmower 100 to detect a collision while moving in a forwards direction, i.e. a forwards collision, and a rear collision detector 175-2, enabling the robotic lawnmower 100 to detect a collision while moving in a reverse direction, i.e. a reverse collision.

The robotic lawnmower 100 further comprises one or more sensors for deduced navigation 180. Examples of sensors for deduced reckoning are odometers, accelerometers, gyroscopes, and compasses to mention a few examples. In the example of FIG. 1B, the robotic lawnmower 100 comprises two odometers 180-1, being wheel turn counters, enabling the robotic lawnmower 100 to count the number of wheel turns executed by two opposite wheels and thereby both determine a distance travelled (equaling number of wheel turns multiplied with the diameter of the wheel), and also any directional changes (by noting differences in wheel turns between the two wheels). In the example of FIG. 1B, the robotic lawnmower 100 further comprises an accelerometer 180-2 enabling the robotic lawnmower 100 to not only determine directional changes, but also changes in altitude and current inclination. The accelerometer 180-2 also enables the robotic lawnmower 100 to determine movements in a sideways direction, for example caused by the robotic lawnmower 100 slipping or sliding. The accelerometer 180-2 can thus be employed by the robotic lawnmower 100 to determine if the path taken determined by the odometers is reliable or not. If the accelerometer senses a significant number or a significant severity of movements (i.e. movements exceeding a threshold with regards to direction and amplitude) not corresponding to the wheel turns, the path is not reliable. The accelerometer 180-2 may also be used to detect collisions.

In one embodiment, the robotic lawnmower 100 may further comprise at least one navigation sensor, such as a beacon navigation sensor and/or a satellite navigation sensor 190. The beacon navigation sensor may be a Radio Frequency receiver, such as an Ultra Wide Band (UWB) receiver or sensor, configured to receive signals from a Radio Frequency beacon, such as a UWB beacon. Alternatively or additionally, the beacon navigation sensor may be an optical receiver configured to receive signals from an optical beacon. The satellite navigation sensor may be a GPS (Global Positioning System) device or other Global Navigation Satellite System (GNSS) device.

In embodiments, where the robotic lawnmower 100 is arranged with a navigation sensor, the magnetic sensors 170 are optional.

In one embodiment, the robotic lawnmower 100 may further comprise a camera 195 or other optical recorder, arranged to perform path analysis, object detection or other vision based operations.

Figure 2:
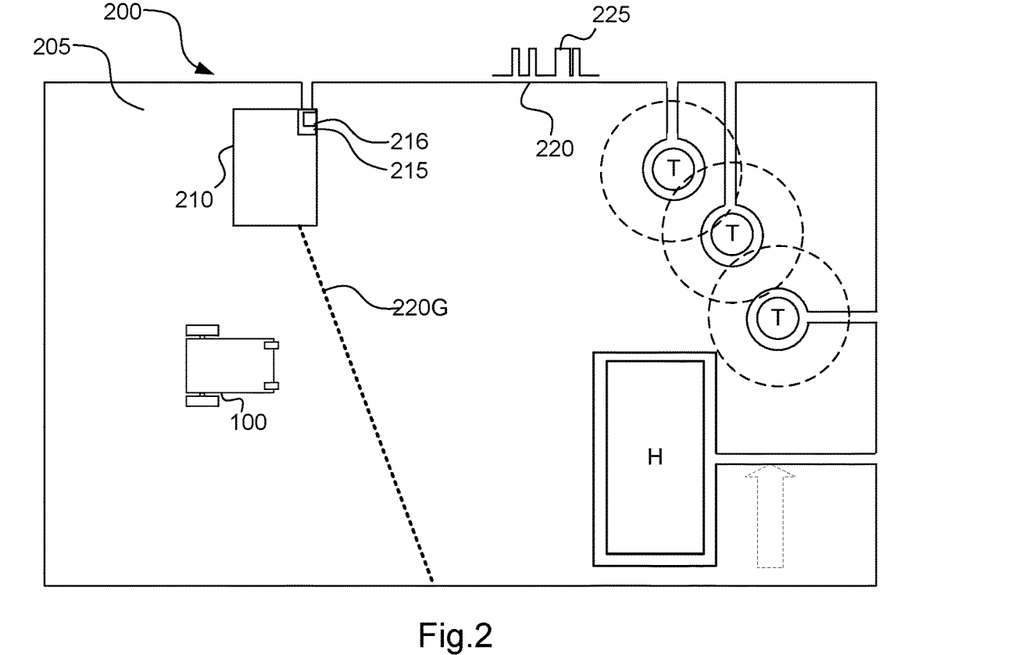
FIG. 2 shows an example of a robotic work tool system being a robotic lawnmower system according to an example embodiment of the teachings herein.

FIG. 2 shows a schematic view of a robotic work tool system 200 in one embodiment. The schematic view is not to scale. The robotic work tool system 200 comprises a robotic work tool 100. As with FIGS. 1A and 1B, the robotic work tool is exemplified by a robotic lawnmower, whereby the robotic work tool system may be a robotic lawnmower system or a system comprising a combinations of robotic work tools, one being a robotic lawnmower, but the teachings herein may also be applied to other robotic work tools adapted to operate within a work area.

The robotic work tool system 200 may also comprises charging station 210 which in some embodiments is arranged with a signal generator 215 and a boundary wire 220.

The signal generator is arranged to generate a control signal 225 to be transmitted through the boundary wire 220. To perform this, the signal generator is arranged with a controller and memory module 216. The controller and memory module 216 operates and functions in the same manner as the controller 110 and memory 120 of the robotic work tool 100. The controller and memory module 216 may also be the controller and memory module of the charging station, hereafter simply referred to as the controller 216.

In addition or as an alternative embodiment the controller and memory module 216 may also comprise or be connected to a communication interface (not shown explicitly but considered to be part of the controller and memory module). The communication interface is enabled for communicating with other devices, such as a server, a personal computer or smartphone, a robotic work tool 100, another signal generator 215 and/or another charging station 210 using a wireless communication standard. Examples of such wireless communication standards are Bluetooth®, WiFi® (IEEE802.11b), Global System Mobile (GSM) and LTE (Long Term Evolution), to name a few.

The boundary wire 220 is arranged to enclose a work area 205, in which the robotic lawnmower 100 is supposed to serve. The control signal 225 transmitted through the boundary wire 220 causes a magnetic field (not shown) to be emitted.

In one embodiment the control signal 225 is a sinusoid periodic current signal. In one embodiment the control signal 225 is a pulsed current signal comprising a periodic train of pulses. In one embodiment the control signal 225 is a coded signal, such as a CDMA signal.

As an electrical signal is transmitted through a wire, such as the control signal 225 being transmitted through the boundary wire 220, a magnetic field is generated. The magnetic field may be detected using field sensors, such as Hall sensors. A sensor—in its simplest form—is a coil surrounding a conductive core, such as a ferrite core. The amplitude of the sensed magnetic field is proportional to the derivate of the control signal. A large variation (fast and/or of great magnitude) results in a high amplitude for the sensed magnetic field. The variations are sensed and compared to a reference signal or pattern of variations in order to identify and thereby reliably sense the control signal. The robotic work tool is thus configured to recognize the control signal 225 and based on the polarity of the sensed control signal 225, the robotic work tool is able to determine whether it is inside or outside the work area 205

The robotic work tool system 200 may also optionally comprise at least one beacon (not shown) to enable the robotic lawnmower to navigate the work area using the beacon navigation sensor(s) 175.

The work area 205 is in this application exemplified as a garden, but can also be other work areas as would be understood. The garden contains a number of obstacles (O), exemplified herein by a number (3) of trees (T) and a house structure (H). The trees are marked both with respect to their trunks (filled lines) and the extension of their foliage (dashed lines).

As can be seen in FIG. 2, the boundary wire 220 has been laid so that so-called islands are formed around the trees' trunks and the house (H). This requires that more boundary wire is used, than if the work area was without such obstacles. It should be noted that any distances between wires are greatly exaggerated in this application in order to make the distances visible in the drawings. In a real-life installations the boundary wire is usually laid so that there is not distance between the wire going out and the wire coming back (distance=0). This allows the robotic work tool 100 to cross any such sections (indicated by the dashed arrow in FIG. 2) as the magnetic field emitted by the wire going out cancels out the magnetic field emitted by the wire coming back.

Optionally there may be one or more additional wires acting as guide wires 220G (possibly provided as loops of the boundary wire 220). These may be used to guide the robotic work tool 100, such as for finding the way to the charging station more quickly.

As discussed in the background section, the inventors have realized that a robotic work tool 100 may be restricted or limited in its movements by possibly being confined or trapped in a smaller sub-area of the work area. The robotic work tool 100 may be trapped by physically being trapped between two objects, such as being unable to navigate pass objects, or by being unable to find its way out of a sub-area of the work area 205.

Figure 3:
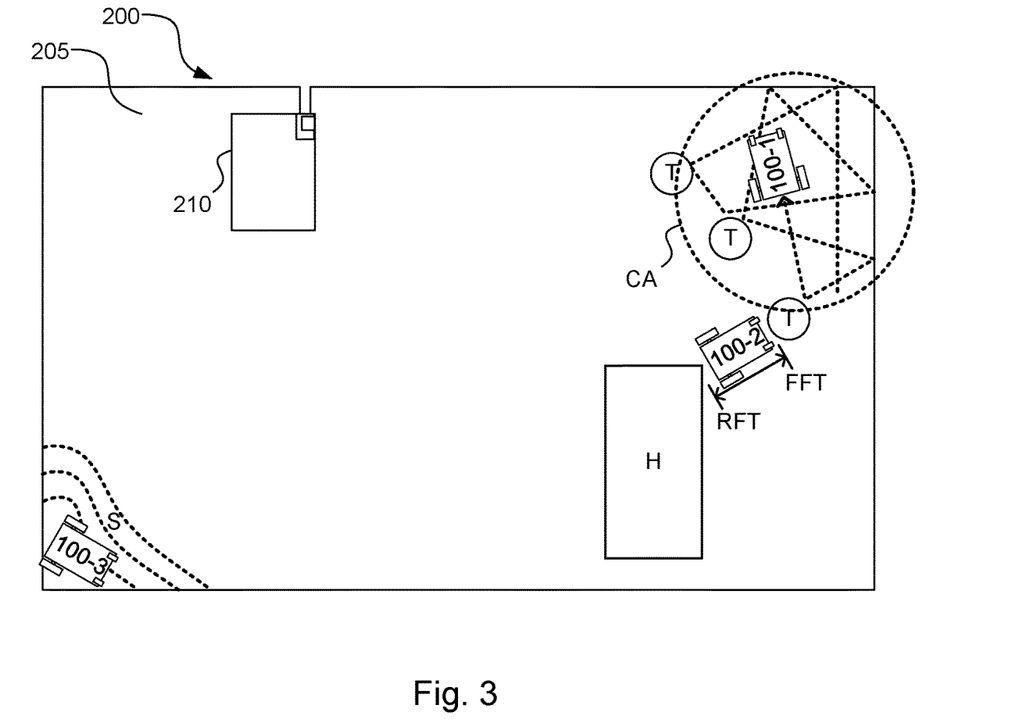
FIG. 3 shows a schematic view of a robotic work tool system according to an example embodiment of the teachings herein.

FIG. 3 illustrates some examples of how a robotic work tool 100 can become limited in its movement in a schematic view of a robotic work tool system 200 according to one embodiment of the teachings herein. The schematic view is not to scale. One robotic work tool 100-1 has become limited in its movements by not being able to find its way out of a confined area (indicated by the dotted circle labelled CA in FIG. 3). Another robotic work tool 100-2 has become limited in its movements by not being able to navigate passed objects, in this example the house (H) and a tree (T). A third robotic work tool 100-3 has become limited in its movements by being unable to navigate out of a hollow that the robotic work tool 100-3 possibly has slid down into.

Figure 4:
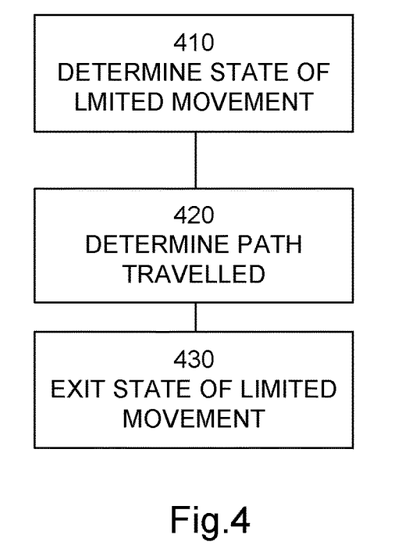
FIG. 4 shows a corresponding flowchart for a method according to an example embodiment of the teachings herein.
Figure 5:
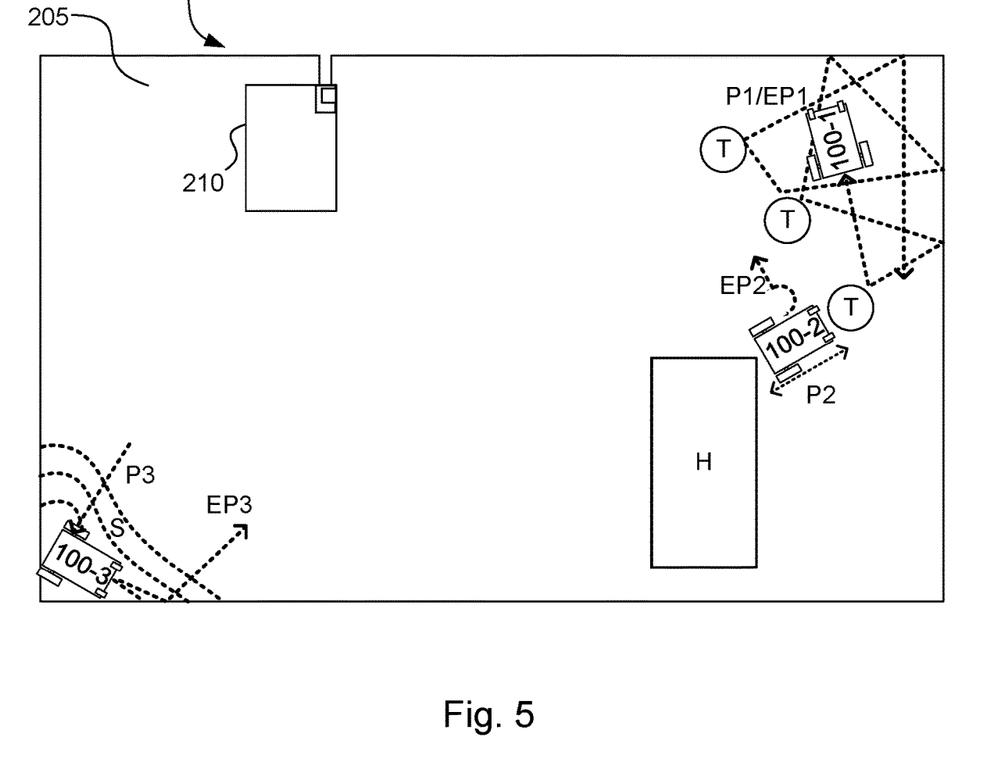
FIG. 5 shows a schematic view of a robotic work tool system according to an example embodiment of the teachings herein.

The teachings herein will now be discussed in detail giving simultaneous reference to FIGS. 3, 4 and 5. FIG. 4 shows a flowchart of a general method according to the teachings herein and FIG. 5 illustrates some examples of how a robotic work tool 100 can exit a state where it is limited in its movement in a schematic view of a robotic work tool system 200 according to one embodiment of the teachings herein.

The robotic work tool 100 is configured to determine 410 that the robotic work tool has entered a state of limited movement.

The robotic work tool 100 may be configured to determine that the robotic work tool has entered a state of limited movement in a number of different manners that in part depend on the manner that the robotic work tool 100 entered the state of limited movement. It should be noted that all manners discussed herein may be performed in combination supplementing each other.

In one embodiment the robotic work tool 100 is configured to determine that the robotic work tool has entered a state of limited movement by determining that the robotic work tool 100 has been travelling within an area smaller than a threshold size, i.e. a confined area (CA), for a threshold period of time.

In one embodiment, the robotic work tool 100 may be configured to determine the size of the area travelled by determining an envelope of the path travelled during the period of time, for example based on the input from the sensors for deduced reckoning 180. Alternatively or additionally, the robotic work tool 100 may be configured to determine the size of the area travelled by determining a first distance travelled in a first direction, determining a second distance travelled in a second direction and multiplying the first distance with the second distance, taking into account the angle between the first direction and the second direction.

The threshold size of the confined area, is in one embodiment based on the size of the work area, such as within 10% of the work area. The threshold size of the confined area, is in addition or as an alternative embodiment based on a specified area, such as within 10, 15 or 20 square meters. The period of time may be set to 5, 10 or 15 minutes.

In addition or as an alternative embodiment the robotic work tool 100 is configured to determine that the robotic work tool has entered a state of limited movement by determining that the robotic work tool 100 has been travelling a maximum distance falling short of a threshold distance for a threshold period of time. If the robotic work tool is unable to travel significant distances before having to turn again, it is an indication that the robotic work tool may be limited in its movements.

In one embodiment, the robotic work tool 100 is configured to determine the distance travelled as an accumulated distance travelled in a direction, taking into account the robotic work tool having to execute turns, possibly due to a collision or encountering a boundary wire, counting distances in opposing directions against one another, i.e. reducing the distance travelled in a direction by distances travelled in an opposite direction.

The accumulated distance (D) in a specific direction may be determined by summarizing each distance travelled (Di) multiplied by the cosine of the angle of the direction travelled (di) relative the specific direction (d);

$$D=\Sigma Di*\cos(di-d)$$

where the directions are expressed as angles.

In one example the specific direction may be along a side of the work area. The accumulated distance may in one embodiment be determined for more than one directions, for example for a first specific direction and a second specific direction. In one example the first specific direction may be along a side of the work area. In one example the second specific direction may be a direction orthogonal to the first direction.

The accumulated distance (D) in any (out of all) directions, i.e. the distance that all movements of the robotic work tool has resulted in (the resulting movement), the direction of such resulting movement being the resulting direction and the distance the resulting distance, may be determined by treating each segment that the robotic work tool 100 has travelled as a vector Si comprising the distance travelled Di and the direction travelled in di; Si={Di, di}, and then summarising the all vectors Si and taking the length of the sum vector S;

$$D=|S|=|\Sigma Si|=|\Sigma\{Di,di\}|$$

The direction of the sum vector S, i.e. the direction of the accumulated distance, may be determined as argument of the sum vector S; d=arg(S).

The threshold distance, is in one embodiment based on the size of the work area, such as within 10% of a side of the work area. The threshold distance, is in addition or as an alternative embodiment based on a specified area, such as 2, 5, or 10 meters. The period of time may be set to 5, 10 or 15 minutes.

In one embodiment, the robotic work tool 100 is configured to determine the distance travelled as a distance travelled without the robotic work tool 100 being forced to execute a turn, such as due to a collision or encountering a boundary wire, i.e. the longest continuous distance travelled in a direction.

In one embodiment a forced turn is a turn resulting from detecting a collision. In one embodiment a forced turn is a turn resulting from detecting a collision or encountering a boundary wire.

In addition or as an alternative embodiment the robotic work tool 100 is configured to determine that the robotic work tool has entered a state of limited movement by determining that the robotic work tool 100 has detected a number of forced turns FTN exceeding a forced turn threshold number FTTN.

In one such embodiment the robotic work tool 100 is configured to determine that the robotic work tool has entered a state of limited movement by determining that the robotic work tool 100 has detected a number of forced turns FTN exceeding a forced turn threshold number FTTN during a threshold period of time. In one embodiment, the period of time is 2, 5, 10 minutes and the TCN is 10, 20 or 50 collisions respectively. In one such embodiment the robotic work tool 100 is configured to determine that a forced turn frequency FTF exceeds a forced turn frequency threshold FTFT. In one embodiment, the FTFT is 1 forced turn per 5, 10 or 20 seconds.

In an alternative or additional such embodiment where the robotic work tool 100 is configured to determine that the robotic work tool 100 has detected a number of forced turn FTN exceeding a threshold forced turn threshold number FTTN, the robotic work tool 100 is configured to determine that the robotic work tool has entered a state of limited movement by determining that the robotic work tool 100 has detected a number of forced turns FTN exceeding a forced turns threshold number FTTN during a threshold distance of travel. In one embodiment, the distance travelled is 2, 5, or 10 meters and the CNT is 5, 10 or 20 collisions respectively.

In addition or as an alternative embodiment the robotic work tool 100 is configured to determine that the robotic work tool has entered a state of limited movement by determining that the robotic work tool 100 has detected a number FRCN of forwards forced turns (FFT) in series with reverse forced turn (RFT) (i.e. a repeated series of forwards and reverse collisions (or encounterings of a boundary wire), indicating that the robotic work tool 100 is trapped between two or more objects, possibly boundary wires) exceeding a threshold front/reverse forced turns number TFRFTN. In one embodiment the TFRFTN is 5, 10 or 20 forced turns. In one such embodiment, the robotic work tool 100 is configured to determine the FRFTN during a threshold time period, for example 1, 2 or 5 minutes. In an alternative or additional such embodiment, the robotic work tool 100 is configured to determine the FRFTN during a threshold distance travelled, for example 1, 2 or 5 meters.

As discussed above, the robotic work tool 100 may be arranged to detect a collision by utilizing the collision detectors 175. Alternatively or additionally, and as discussed above, the robotic work tool 100 may be arranged to detect a collision by utilizing the accelerometer 180-2. The robotic work tool 100 may alternatively or additionally be arranged to detect a collision by monitoring the currents provided to the wheel motors 150.

In addition or as an alternative embodiment the robotic work tool 100 is configured to determine that the robotic work tool has entered a state of limited movement by determining that the maximum distance between two forced turns (due to a collision or encountering a boundary wire, as discussed above) falls short of a threshold minimum distance. In one embodiment, the minimum distance is 0.2, 0.5 or 1 meter. In one such embodiment, the robotic work tool 100 is configured to determine the maximum distance between two turns during a threshold time period, for example 1, 2 or 5 minutes. In an alternative or additional such embodiment, the robotic work tool 100 is configured to determine the maximum distance between two turns during a threshold distance travelled, for example 1, 2 or 5 meters.

In addition or as an alternative embodiment the robotic work tool 100 is configured to determine that the robotic work tool has entered a state of limited movement by determining a position of the robotic work tool and to determine that the position of the robotic work tool has not been changed by a distance exceeding a threshold distance for a threshold period of time and/or for a threshold distance travelled. In one embodiment, the threshold distance is 2, 5 or 10 meters, the threshold period of time is 1, 2, or 5 minutes and the threshold distance travelled is 10, 20, or 50 meters.

The different time periods discussed above used to determine whether the robotic work tool has entered a state of limited movement may be absolute or depend on external factors. The same is also applicable to any frequencies discussed above.

In one embodiment, where the robotic work tool 100 is configured to determine the slope of an area, the period of time is based on the slope of an area, where an area with a steeper slope would utilize a shorter time period, indicating that there is a higher risk of the robotic work tool 100 entering a state of limited movement when traversing an area with a high slope.

The robotic work tool may be configured to determine the slope (S) of an area, by utilizing the accelerometer 180-2 or other sensor such as a gyroscope. Alternatively or additionally, the robotic work tool may be configured to determine the slope of an area, by determining a current area occupied by the robotic work tool and receive an indication of the slope of that area from a map application, possibly stored in the memory 120 of the robotic work tool 100. The current area occupied by the robotic work tool 100 may be determined utilizing the sensors for deduced reckoning 180.

A robotic work tool 100 continuously traversing already serviced areas is also indicative of the robotic work tool having entered a state of limited movement. In one embodiment the period of time is based on the operating intensity of the robotic work tool 100, where an area with a lower operating intensity would utilize a shorter time period, indicating that the robotic work tool 100 is continuously traversing an area already serviced, assuming that the operating intensity goes down after servicing an area. Such is the case for robotic lawnmowers as an example, as the load on the cutting blades 160 goes down after the grass has been cut (which may be detected by noting a reduction in power provided from the cutting motor, or an increase in speed of the cutter 160). However, a robotic rototill (or rotary cultivator) may experience a higher operating intensity when operating in an already serviced area, where an increase in operating intensity would utilize a shorter time period. The change in operating intensity may thus affect the time periods differently depending on the type of robotic work tool. How the operating intensity is determined also depends on the type of robotic work tool, but is generally determined based on the power provided to the work tool or the speed of the work tool. For a robotic lawnmower, the operating intensity may be determined indirectly through determining the height of the grass.

In addition or as an alternative embodiment the robotic work tool 100 is configured to determine that the robotic work tool has entered a state of limited movement by determining that the robotic work tool 100 has slipped or skidded. In one embodiment, the determination that the robotic work tool 100 has slipped or skidded is performed in combination with another determination that the robotic work tool has entered a state of limited movement, wherein the determination that the robotic work tool 100 has slipped or skidded serves to reduce a threshold time period, reduce a minimum distance o, area or size or to reduce a number of collisions.

For the context of this application there will be made no difference between skidding or slipping, skidding usually meaning a sliding movement in a travelled direction, and slipping usually meaning sliding in an unwanted or not travelled direction, and they will both be referred to as sliding, if not explicitly detailed otherwise.

In one embodiment the robotic work tool 100 is configured to determine that the 100 has slid by detecting a movement not corresponding to a calculated movement (or expected movement), having been calculated based on input from sensors for controlling the robotic work tool and/or from sensors for deduced reckoning for example based on the odometers 180-1. In such an embodiment, the robotic work tool 100 is configured to detect the movement, for example by receiving input thereof from the accelerometer 180-2 (or other sensor for deduced reckoning such as a gyroscope) and to compare the detected movement to a calculated movement that is determined based on the odometers (for example wheel counters) 180-1, possibly in combination with other sensors for deduced reckoning. If for example, the detected movement indicates a sideways movement while the calculated movement indicates a forwards movement, the robotic work tool 100 may determine that the robotic work tool has slid sideways. In one embodiment, the robotic work tool 100 is configured to also take the current slope (see above for details on how the slope may be determined) in to account. If, in the example presently discussed, the detected movement is a movement in the direction of the slope (downwards), the robotic work tool 100 may determine that the robotic work tool 100 has slid down the slope. In response to this, the time period, threshold distances or such may be adapted to more readily detect (i.e. reducing the distances etc. to enable a faster detection) that the robotic work tool has entered a state of limited movement. If, on the other hand, the detected movement is a movement in the direction opposite the slope (upwards), the robotic work tool 100 may determine that the robotic work tool 100 has experienced a sideways collision, possibly with a user or a pet.

The detected movement may also not match the calculated movement by simply the robotic work tool having travelled at a speed different than indicated by the wheel turns, which indicates that the robotic work tool is sliding in the direction of travel. A faster travel indicates that the robotic work tool is sliding in the direction of travel (such as down a slope). A slower travel indicates that the robotic work tool is unable to find grip, such as trying to get up a hill, but slipping.

In addition or as an alternative embodiment the robotic work tool 100 is configured to determine that the robotic work tool 100 has slid by simply detecting a sideways movement, sideways taken to be in a direction not aligned with the directions of the wheels 130.

In addition or as an alternative embodiment the robotic work tool 100 is configured to determine that the robotic work tool 100 has slid by detecting wheel slip, which may be detected by a wheel rotating at a speed not corresponding to the power delivered to it.

In addition or as an alternative embodiment the robotic work tool 100 is configured to determine that the robotic work tool 100 has slid based on the sensors for deduced reckoning 180, possibly through one of the manners discussed herein or through other manners of detecting a slid based on deduced sensor input.

In one embodiment the robotic work tool 100 is also configured to determine 420 a path that the robotic work tool 100 has travelled, which path lead to the state of limited movement (the travelled path).

Especially in embodiments where the exit path (to be discussed below) is not dependent on the path travelled, the path travelled need not be determined and this step is thus optional. The dotted line indicates the path travelled for the second robotic work tool 100-2 in FIG. 3. The robotic work tool 100 may be configured to determine the path that the robotic work tool 100 had travelled in a number of different manners.

In one embodiment the robotic work tool 100 is configured to determine the travelled path by storing navigational operations for a travelling time period. The robotic work tool 100 is thus configured to buffer the most recent path travelled. A navigational operation may correspond to or comprise a command causing a wheel to turn in a direction at a threshold speed for a specific time (or until a next navigational operation). A navigational operation may alternatively or additionally comprise a count of wheel turns (in a direction at a threshold speed). A navigational operation may alternatively or additionally comprise noting a distance travelled. A navigational operation may alternatively or additionally comprise noting a speed travelled at for an associated time. A navigational operation may alternatively or additionally comprise noting a directional change, such as by noting input from an accelerometer 180-2) or by counting wheel turns in different directions and/or at different speeds (also depending on the size of the wheels, if different). Such navigational operations allows for recreating the travelled path by repeating the navigational operations. A navigational operation may alternatively or additionally comprise noting a collision for a threshold collision detector 175. Such a navigational operation allows for recreating the travelled path by repeating the preceding navigational operations until a collision with the specified collision detector is detected.

In addition or as an alternative embodiment the robotic work tool 100 is configured to determine the travelled path by utilizing a camera 195 or other optical recorder. The camera 195 may be utilized to store the path travelled, by continuously or repeatedly noting objects (landmarks) in the environment, the order of those landmarks indicating or providing a path. The travelled path may then be recreated by searching for and navigating towards the objects (landmarks) detected.

Alternatively or additionally, the travelled path may be stored as a video sequence. The travelled path may then be recreated by capturing a new video sequence and navigating so that the new video sequence corresponds to the old or previously recorded video sequence.

Alternatively or additionally, the travelled path may be determined based on sensor input from the GNSS sensor 190 if such is comprised in the robotic work tool 100.

In one embodiment the travelling time period corresponds to the threshold time period(s) for determining that the robotic work tool has entered the state of limited movement. In one embodiment the travelling time period is longer the threshold time period(s) for determining that the robotic work tool has entered the state of limited movement. This increases the likelihood that a path is stored that corresponds to the path that led the robotic work tool into the state of limited movement. In one embodiment the travelling time period corresponds to double the threshold time period(s) for determining that the robotic work tool has entered the state of limited movement. In one embodiment the travelling time period does not correlate to or relate to the threshold time period(s) for determining that the robotic work tool has entered the state of limited movement. In one such an embodiment, the travelling time is 10, 20, 30, 45 or 60 minutes. In one such alternative or additional embodiment, the travelling time is in the range 10 to 60, 20 to 120, or 30 to 300 minutes. In addition or as an alternative embodiment, the travelling time is the time since last leaving the charging station 210.

The robotic work tool 100 is further configured to exit 430 the state of limited movement by navigating an exit path based on the path that the robotic work tool 100 had travelled. In one embodiment the robotic work tool 100 is further configured to determine the exit path based on the determination that the robotic work tool had entered a state of limited movement.

In one embodiment, the robotic work tool is configured to determine that the exit path is the reverse of the path travelled. In such an embodiment, the robotic work tool is thus arranged to exit the state of limited movement by reversing out of the state, the same way it entered the state. In one such embodiment, the robotic work tool 100 is configured to determine that the exit path is the reverse of the path travelled if the determination that the robotic work tool had entered a state of limited movement was based on a travelling distance falling short, the size of a travelled area falling short, or similar in combination with a detection of a slid.

In one embodiment, the robotic work tool is configured to determine that the exit path is the reverse of the path travelled, but preceded with a 180 degree rotation of the robotic work tool 100. In such an embodiment, the robotic work tool is thus arranged to exit the state of limited movement by travelling out of the state the same way it entered the state, but the robotic work tool facing the opposite direction as when entering, ensuring (or at least increasing the likelihood) that all navigational operations are executed in a same manner as when entering the state. This may provide a different degree of grip or climbing ability. It may also provide a different degree of turning compared to simply reversing. In one such embodiment, the robotic work tool 100 is configured to determine that the exit path is the reverse of the path travelled if the determination that the robotic work tool had entered a state of limited movement was based on a travelling distance falling short, the size of a travelled area falling short, or similar. In FIG. 5, the first robotic work tool 100-1 shows an example of such a travelled path P1 and exit path EP1 (basically being the same, but in opposite directions).

In one embodiment, the robotic work tool is configured to determine that the exit path is a path repeatedly crossing the path travelled, which increases the likelihood of not repeating actions or operations that caused the robotic work tool to enter the limited state, such as getting trapped.

In one embodiment, the robotic work tool is configured to determine that the exit path is the path travelled, but leaving and re-entering the path travelled at a later stage for example with an added start of turning 90 degrees, travelling for a distance of 0.5, 1, 2 or 5 meters, turning 270 degrees, travelling for a distance of 0.5, 1, 2 or 5 meters, turning 270 degrees again, travelling for a distance of 0.5, 1, 2 or 5 meters, and turning 90 degrees. This increases the likelihood of not repeating actions or operations that caused the robotic work tool to enter the limited state, such as getting trapped.

In one embodiment, the robotic work tool is configured to determine that the exit path is an extension or projection of the path travelled. This may be helpful in situations where a slid has been detected whereby a robotic work tool may exit such a situation or area, by moving in the direction that the slid takes it.

In one embodiment, the robotic work tool is configured to determine a start position of the robotic work tool 100 in the current path travelled and to determine that the exit path is a path to the start position followed by a turn in a direction opposite the direction travelled at that position in the path travelled. This enables the robotic work tool to exit the current area without having to repeat the whole pattern of navigational operations.

In one embodiment, the robotic work tool is configured to determine that the exit path is to rotate for example 180 degrees and thereafter move away from the path travelled. This increases the likelihood of the robotic work tool escaping a situation where it is trapped between one or more objects and may be selected if the number of collisions was decisive when determining that the robotic work tool had entered the state of limited movement. In FIG. 5, the second robotic work tool 100-2 shows an example of such a travelled path P2 and exit path EP2.

In one embodiment, the robotic work tool is configured to determine that the exit path is a path in a direction where there are no or few detected collisions in the path travelled. This increases the likelihood of the robotic work tool escaping a situation where it is trapped between one or more objects and may be selected if the number of collisions was decisive when determining that the robotic work tool had entered the state of limited movement. In FIG. 5, the second robotic work tool 100-2 shows an example of such a travelled path P2 and exit path EP2.

In such an embodiment, the robotic work tool 100 may for each direction compare segments where a collision was detected and by backtracking the path travelled, determine if that segment is in a specified direction. Alternatively, the robotic work tool 100 may determine for each segment where a collision was detected determine the direction of the collision, possibly by backtracking the path travelled, summarize the determine directions and determine a direction having the fewest (or none) collisions as the direction to travel.

In one embodiment, the robotic work tool is configured to determine that the exit path is a path in a direction orthogonal to or at least not aligned with the path travelled. This may enable a robotic work tool to exit a situation where it has slipped into a state of limited movement and may be selected if a detection of slid was decisive when determining that the robotic work tool had entered the state of limited movement. In FIG. 5, the third robotic work tool 100-3 shows an example of such a travelled path P3 and exit path EP3.

In one embodiment, the robotic work tool is configured to determine that the exit path is a path leading to a boundary wire 220 (or a guide wire 220G) and follow such a wire out of the state of limited movement. In such an embodiment the robotic work tool 100 may thus be configured to search for a wire, such as a boundary wire 220 and/or a guide wire 220G, and as a wire is found, follow the wire to escape the state of limited movement. In one embodiment the robotic work tool is configured to follow the wire at least for an escape distance. The escape distance may be random or predetermined. The escape distance may be 5, 10, 15, 20, 25 or more meters. The exit path is then comprised of the navigational operations to search for a wire and to follow the wire, In one embodiment the robotic work tool 100 is configured to resume or take up an operating pattern as the state of limited movement has been exited (such as when the wire has been followed for a distance and/or time). In one embodiment, the operating pattern indicates a random operation. In one embodiment, the operating pattern indicates a structured movement (i.e. operation) pattern across—at least partially—the work area. One example of a structured pattern is to operate in parallel strokes.

In one embodiment, the robotic work tool is configured to determine that the exit path is a rotation followed by a movement. In such an embodiment the robotic work tool 100 is thus configured to rotate and then try to find its way out of the state of limited movement.

The following movement may be a straight movement in a direction. In such an embodiment the robotic work tool 100 is thus configured to rotate and then try to find its way out of the state of limited movement by travelling in a direction at least for a minimum escape distance attempting to distance the robotic work tool from the area where the state of limited movement occurred. The escape distance may be random or predetermined. The escape distance may be 5, 10, 15, 20 or more meters.

The following movement may alternatively or additionally be a series of movements in distances changing directions. In such an embodiment the robotic work tool 100 is thus configured to rotate and then try to find its way out of the state of limited movement by travelling in a varying direction attempting to distance the robotic work tool at least a minimum distance from the area where the state of limited movement occurred while reducing the risk of running into obstacles.

The following movement may alternatively or additionally be a random movement. In such an embodiment the robotic work tool 100 is thus configured to rotate and then try to find its way out of the state of limited movement by travelling in a random direction attempting to distance the robotic work tool from the area where the state of limited movement occurred while reducing the risk of running into obstacles or having such collisions substantially influence the exit path, being random anyhow.

Alternatively or additionally, the path may be based on sensing the signal level and steering towards an increased signal level. In such an embodiment, the robotic work tool is configured to determine that the exit path by rotating and/or circulating the robotic work tool 100 and sensing a signal level being picked up from a wire (boundary and/or guide wire), determining a maximum signal level, and then steering the robotic work tool in the direction giving the maximum signal level, presumably steering towards the wire. As noted the robotic work tool may rotate, assumingly around a rotational axis internal to the robotic work tool, to find the maximum signal level. Additionally or alternatively, the robotic work tool 100 may circulate, i.e. travel in a circular (or pseudo-circular) pattern, assumingly around a rotational axis external to the robotic work tool to find the maximum signal level, In one embodiment, the robotic work tool is configured to determine that the exit path based on a map application, possibly stored in the memory 120 of the robotic work tool 100. In one such an embodiment, the robotic work tool is configured to determine a location where the robotic work tool will not be in a state of limited movement. One example of such a position is the starting position of the determined path travelled. The exit path is then determined to be a path to such a location.

In one an embodiment, the robotic work tool is configured to determine the exit path and execute the navigation along the exit path based on sensors for deduced reckoning 180.

The inventors have realized that the general idea behind the present invention of discovering that a robotic work tool is in a state of limited movement based on the current movement pattern as discussed above, may also be sued in cooperation with satellite navigation. In one such embodiment, the robotic work tool is configured to determine that it is in a state of limited movement based on the current movement pattern in any of the manners as discussed herein and then determine the exit path based on the current position retrieved from or based on satellite navigation sensors, such as the GNSS sensor 190. In one embodiment, the robotic work tool is thus configured to determine the exit path and execute the navigation along the exit path based on GNSS sensors 190.

The invention claimed is:

1. A robotic work tool system comprising a robotic work tool, the robotic work tool being configured to
    determine that the robotic work tool has entered a state of limited movement;
    determine an exit path; and
    exit the state of limited movement by navigating the exit path,
    wherein the robotic work tool is configured to determine that the robotic work tool has entered a state of limited movement based on a determination that the robotic work tool has been travelling a maximum distance falling short of a threshold distance, the maximum distance having been travelled during a threshold period of time,
    wherein the robotic work tool is further configured to determine the distance travelled as an accumulated distance travelled in one specific direction,
    wherein the specific direction is a resulting direction of the movements of the robotic work tool during the threshold period of time, and
    wherein the accumulated distance is a resulting distance of the movements of the robotic work tool during the threshold period of time.

2. The robotic work tool system according to claim 1, wherein the robotic work tool is configured to determine that the robotic work tool has entered a state of limited movement based on a determination that a limit event frequency exceeds a limit event frequency threshold.

3. The robotic work tool system according to claim 1, wherein the robotic work tool is further configured to determine the distance travelled as a distance travelled without the robotic work tool being forced to execute a turn.

4. The robotic work tool system according to claim 1, wherein the robotic work tool is configured to determine that the robotic work tool has entered a state of limited movement based on a determination that the robotic work tool has been travelling within an area smaller than a threshold size for a threshold period of time, or based on a determination that the robotic work tool has detected a number of forced turns exceeding a forced turns threshold number.

5. The robotic work tool system according to claim 1, wherein the robotic work tool is configured to determine that the robotic work tool has entered a state of limited movement based on:
    determining a first position of the robotic work tool;
    determining a second position of the robotic work tool after a threshold period of time has passed or after a threshold distance has been travelled;
    and determining that the position of the robotic work tool has not changed significantly, based on a determination that the difference between the first and the second position does not exceed a threshold distance.

6. The robotic work tool system according to claim 1, wherein the robotic work tool is configured to determine the exit path as a path causing the robotic work tool to rotate and then travel an escape distance.

7. The robotic work tool system according to claim 1, wherein the robotic work tool is further configured to determine a path travelled, the path travelled leading to the state of limited movement; and to determine the exit path based on the path travelled.

8. The robotic work tool system according to claim 7, wherein the robotic work tool is configured to determine the path travelled by storing at least one navigational operation.

9. The robotic work tool system according to claim 7, wherein the robotic work tool is configured to determine the exit path based on a reverse of the path travelled.

10. The robotic work tool system according to claim 7, wherein the robotic work tool is configured to determine the exit path by determining a start position of the robotic work tool in the current path travelled and to determine the exit path as a path to the start position.

11. The robotic work tool system according to claim 7, wherein the robotic work tool is configured to determine the exit path as a path comprising the robotic work tool rotating and thereafter moving away from the path travelled.

12. The robotic work tool system according to claim 7, wherein the robotic work tool is configured to determine the exit path as a path in a direction not aligned with the path travelled, or based on a map application, and
wherein the robotic work tool is a robotic lawnmower.

13. A robotic work tool system comprising a robotic work tool, the robotic work tool being configured to
determine that the robotic work tool has entered a state of limited movement;
determine an exit path; and
exit the state of limited movement by navigating the exit path,
wherein the robotic work tool is configured to determine the exit path as a path leading to a wire and to follow said wire,
wherein the robotic work tool is configured to follow the wire for an escape distance, and
wherein the robotic work tool is configured to follow the wire for the escape distance and then navigate in a random manner or according to a structured operation pattern.

14. The robotic work tool system according to claim 13 further comprising a charging station, wherein the robotic work tool is configured to follow the wire to the charging station.

15. A method for use in a robotic work tool system comprising a robotic work tool, the method comprising:
determining that the robotic work tool has entered a state of limited movement;
determine an exit path; and
exit the state of limited movement by navigating the exit path,
wherein the robotic work tool is configured to determine that the robotic work tool has entered a state of limited movement based on a determination that the robotic work tool has been travelling a maximum distance falling short of a threshold distance, the maximum distance having been travelled during a threshold period of time,
wherein the robotic work tool is further configured to determine the distance travelled as an accumulated distance travelled in one specific direction,
wherein the specific direction is a resulting direction of the movements of the robotic work tool during the threshold period of time, and
wherein the accumulated distance is a resulting distance of the movements of the robotic work tool during the threshold period of time.

* * * * *